Patented Mar. 24, 1942

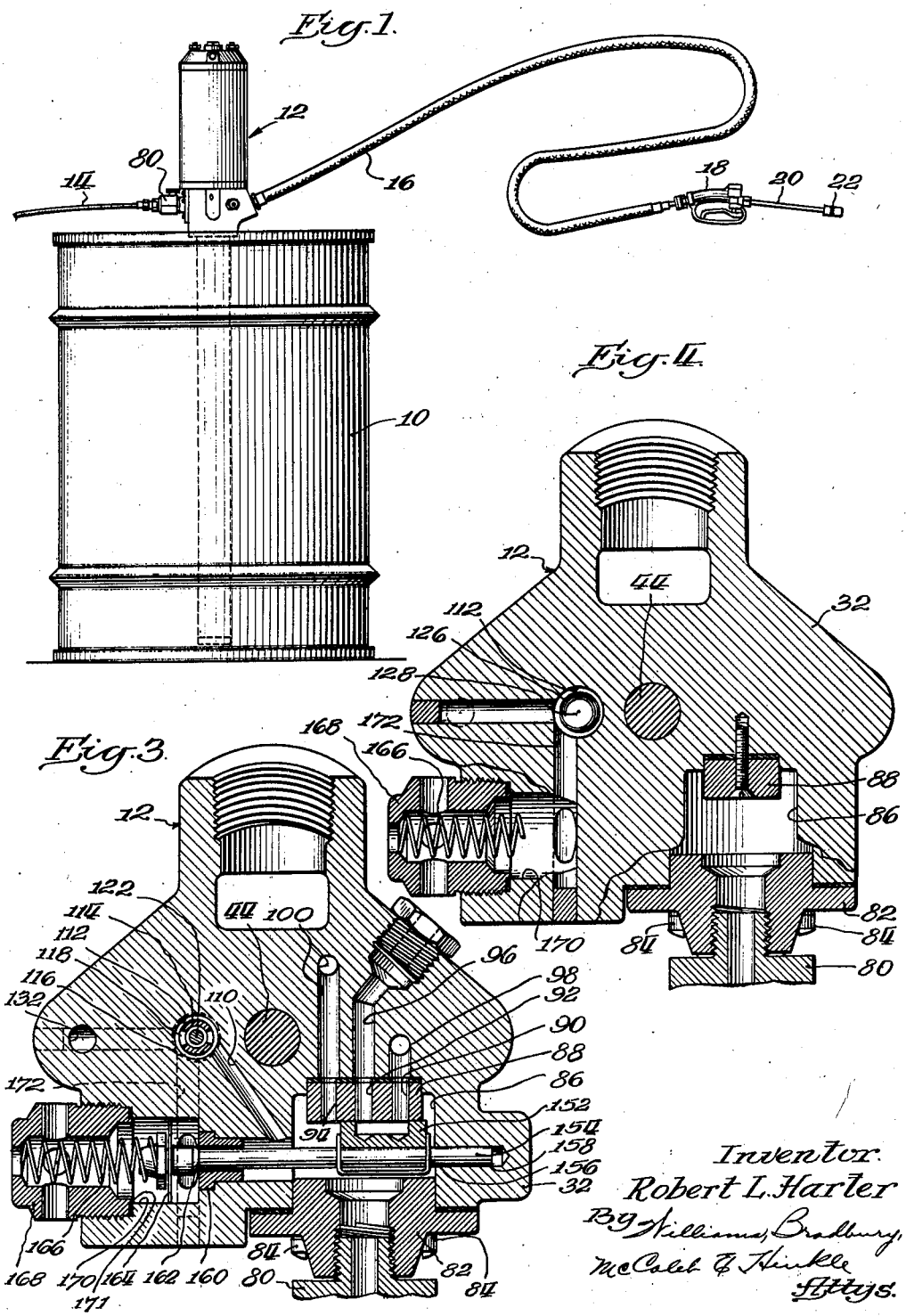

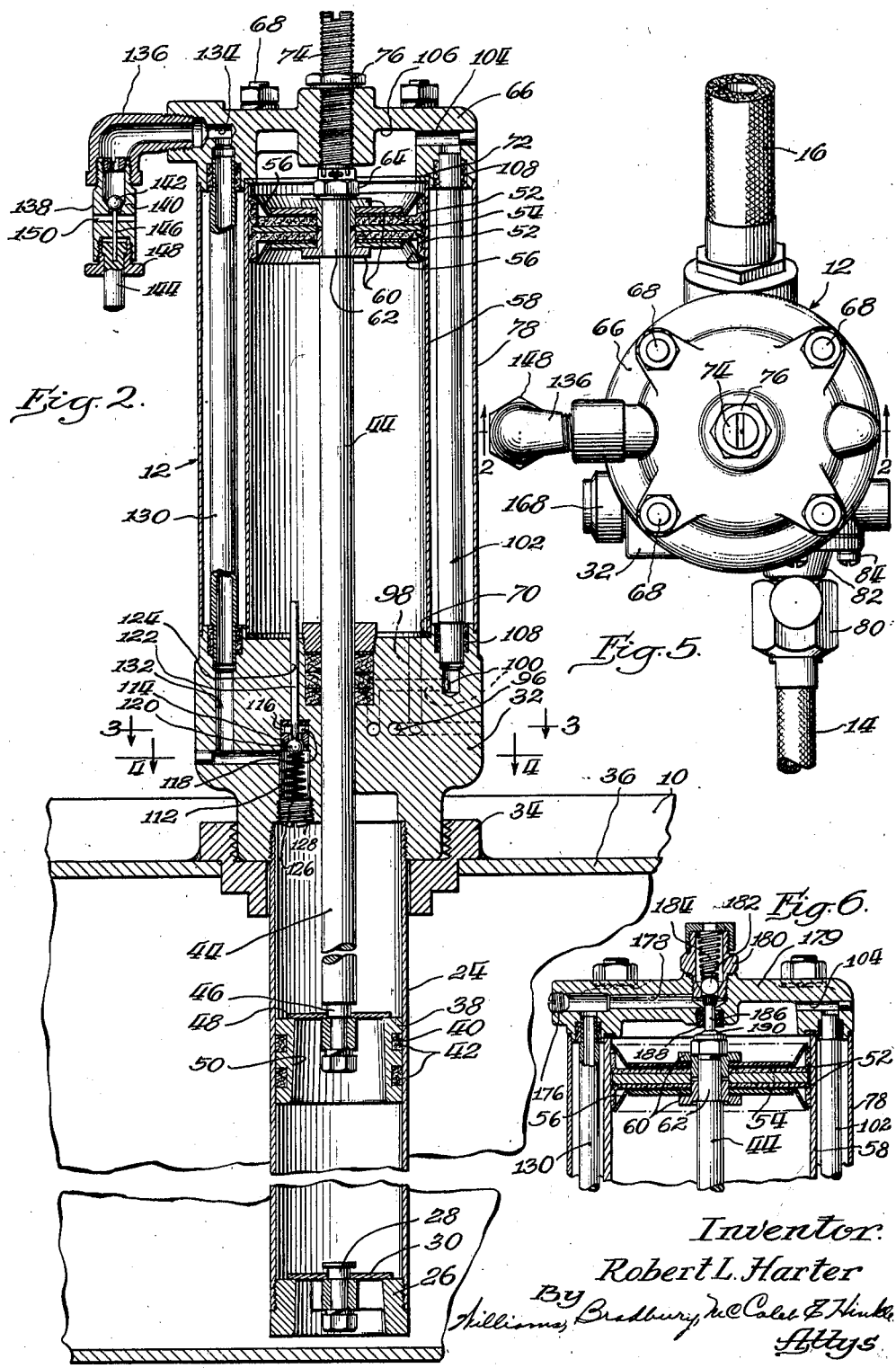

2,277,641

UNITED STATES PATENT OFFICE 2,277,641

FLUID MOTOR FOR LUBRICANT PUMPS

Robert L. Harter, Chicago, Ill., assignor to Stewart-Warner Corporation, Chicago, Ill., a corporation of Virginia Application December 7, 1938, Serial No. 244,363

11 Claims. (Cl. 121—157)

My invention relates generally to lubricating apparatus and more particularly to lubricant compressors of the pneumatically operated type.

It is an object of my invention to provide an improved pneumatically operated lubricant compressor having an improved form of valve for controlling the operation of the compressor.

A further object is to provide an improved pneumatic power means for operating a reciprocatory pump.

A further object is to provide an improved lubricant compressor which will automatically stop after completing one cycle of operation.

A further object is to provide an improved lubricant compressor of the single stroke type, which may be used as a lubricant metering device for dispensing measured quantities of lubricant.

A further object is to provide an improved lubricant compressor of the single stroke type in which the length of the stroke may be adjusted to vary the displacement of the pump piston.

Other objects will appear from the following description, reference being had to the accompanying drawings, in which:

Figure 1 is an elevation of my improved lubricant compressor, shown as mounted upon a lubricant barrel or drum, illustrating the manner in which the compressor is used;

Figure 2 is a central, vertical, sectional view of the compressor;

Figures 3 and 4 are transverse, sectional views taken on the lines 3—3 and 4—4 respectively, of Figure 2;

Figure 5 is a plan view of the compressor; and

Figure 6 is a fragmentary sectional view of a modified form of the invention.

The lubricant compressor of my invention is adapted for use in service stations and the like, particularly for withdrawing grease and other lubricants from the original drums or barrels in which such products are shipped, compressors of this type being customarily referred to as "barrel pumps." The compressor is therefore shown in Fig. 1 as mounted in a drum 10, the compressor, designated generally by the reference numeral 12, being supplied with air under pressure through a hose 14, and the lubricant discharged from the compressor being conveyed to the part to be supplied with lubricant by a hose 16 at the free end of which there is a hand operated valve 18 having a pipe extension 20 which may have a suitable coupler 22 attached thereto for coupling engagement with a lubricant receiving fitting. Under some circumstances, the compressor may be utilized to supply lubricant directly to the bearings of a machine to be lubricated, by connecting the coupler 22 to fittings attached to the bearings, in the usual manner, although in most instances it will be used to refill the barrels or reservoirs of portable manually or power operated grease guns.

As best shown in Fig. 2, the compressor comprises a cylinder 24 having a foot valve seat 26 secured at the lower end thereof, the foot valve seat having a guide 28 secured thereto for a foot valve 30. The upper end of the cylinder 24 is threaded in a body casting 32, which in Fig. 2 is shown as resting in a recess formed in an inlet fitting 34, which is welded to the top 36 of the drum 10. A piston 38 is reciprocable in the cylinder 24, and is provided with external annular grooves 40 to receive suitable ring packings 42.

A piston rod 44 is secured to the piston 38 and has a reduced diameter portion 46 forming a guide for a check valve 48, which, during the upward stroke of the piston, closes the upper end of the bore 50 which extends through the piston, and upon the downward stroke of the piston opens in the usual manner to permit the lubricant to flow through the piston.

The upper end of the piston rod carries an air piston comprising a pair of opposed cup leathers 52 separated by a backing plate 54 and having cup leather formers 56 to retain the flanges of the cup leathers in contact with the bore of the motor cylinder 58. The piston is assembled upon a pair of flanged collars 60 and clamped upon a reduced diameter end portion 62 of the piston rod 44 by means of a castellated nut 64.

A head 66 is secured to the body casting 32 by a plurality of tie bolts 68, and the motor cylinder 58 is thus clamped between the base casting 32 and the head 66, suitable gaskets 70 and 72, respectively, being interposed to seal the ends of the cylinder 58 against these parts.

Upward movement of the piston rod 44 is limited by an adjustable set screw 74 which may be locked in adjusted position by a nut 76. By proper adjustment of this set screw 74, the length of the stroke of the piston rod may be varied so as to cause the discharge of a predetermined quantity of lubricant upon each cycle of operation of the compressor. A protective shell 78 surrounds the tie bolts 68 and other parts, the ends of the shell fitting in suitable annular grooves formed in the upper edge of the base casting 32 and in the lower edge of the head 66.

The compressed air or other power fluid supplied through the hose 14, is controlled by means of a valve 80 (Fig. 1) through a fitting 82, which is secured to the base casting by means of cap screws 84. The fitting 82 forms a closure for a D-slide valve chamber 86 within which is secured a valve seat 88 having ports 90, 92, and 94. The port 92 leads to a passageway 96, which forms a discharge passageway for the exhaust of the air motor to the atmosphere. The port 90 communicates with an upwardly extending passageway 98 which leads to the lower end of the air motor cylinder 58, while the port 94 communicates with a passageway 100 which leads to the upper end of the air cylinder, the air being conveyed through a tube 102 located between the cylinder 58 and shell 78, the upper end of the tube communicating with a duct 104 leading to a recess 106 formed in the inner surface of the head 66. The ends of the tube are suitably sealed by means of packings 108, to prevent the escape of air.

A further passageway 110 leads from the valve chamber 86 to the upper end of a vertical bore 112 (Fig. 2) formed in the base casting 32. A valve seat 114 is secured in the upper end of the bore 112 by an airtight press fit, the valve seat having an annular groove 116 formed therein to register with the passageway 110 and having a plurality of radial ports 118 formed therein. A valve 120 is cooperable with the conical seating surface formed at the lower end of the valve seat 114, and is adapted to be operated by means of a valve stem 122, which is slidable in a vertical bore 124 formed in the base casting 32. The valve 120 is normally held against its seat by a compression coil spring 126 which rests upon a plug 128 threaded in the lower end of the bore 112.

The bore 112 communicates with a tube 130 through an elbow-shaped passageway 132, the upper end of the tube 130 communicating with a suitable passageway 134, the outer edge of which is enlarged and threaded to receive a street L 136. A relief valve 138 is threaded in the L 136, being provided with a seating surface 140 which is adapted to be closed by a ball valve 142. The ball valve is adapted to be raised from its seating surface 140 by a manually operated plunger 144 which has a stem 146 engageable with the valve, the plunger 144 being guided in a suitable bushing 148 threaded in the lower end of the relief valve 138. When the plunger 144 is pressed upwardly to raise the valve 142 from its seating surface, a free passageway for the exhaust of air from the bore 112 is provided, the air exhausting to the atmosphere through ducts 150 formed in the body of the relief valve 138.

The plunger 144 may be operated directly or by remote control through a suitable Bowden wire or similar connection. A D-slide valve 152 (Fig. 3) is secured to its stem 154 by means of a suitable yoke 156, one end of the stem being guided in a bore 158 formed in the base casting 32 and the other end projecting through a bushing 160. A poppet valve surface 162 is formed on the stem 154 for engagement with the end of the bore of the bushing 160, and a combination piston and valve member 164 formed of thin sheet metal is likewise secured to the stem 154. The D-slide valve 152 is normally held in its rightmost position, substantially as shown in Fig. 3, by a compression coil spring 166 which is carried in an apertured plug 168 threaded in the enlarged end of the bore 170. When moved to its leftmost position, the piston valve 164 engages the end surface 171 of the plug 168. The bore 170 communicates with the vertical bore 112 through a passageway 172.

In using the compressor, it will be placed in a drum 10, containing lubricant, and the piston rod 44, with the pistons carried thereby, will normally be in the position in which these parts are shown in Fig. 2. When the operator desires to discharge a certain amount of lubricant from the compressor, he will press upwardly upon the plunger 144, thus opening the relief valve 142 and venting the bores 112 and 170 (through the passageway 172) to the atmosphere. Under these circumstances, the spring 166 acting upon the slide valve stem 154 will move the valve 152 to the right, to connect the lower end of the air cylinder 58 to the atmosphere through the passageway 98, ports 92 and 92, and passageway 96. At the same time, air under pressure will be supplied to the upper end of the air cylinder 58 through the port 94, passageway 100, tube 102, and duct 104. The air piston will thus be subjected to pressure on its upper surface, whereas its lower surface will be at atmospheric pressure, and the piston will therefore be forced downwardly.

During the downward motion of the piston, lubricant will be trapped between the foot valve 30 and the piston, and will be displaced past the piston valve 48 into the upper end of the cylinder 24. A certain amount of the lubricant within the cylinder 24 will be displaced by the piston rod 44 and discharged through the hose 16 to the part to which lubricant is being supplied.

Near the end of the downward stroke of the air piston, it will strike the upper end of the stem 122, thus opening the valve 120 and re-admitting air under pressure to the bores 112 and 170, through the passageway 110, port 118, and passageway 172. When the portion of the bore 170 to the right of the piston 164 is thus subjected to the pressure of the air supply, it will be forced to the left (Fig. 3) against the force of the spring 166, thereby moving the D-slide valve 152 to its other extreme position, where it is effective to interconnect the ports 92 and 94, and to uncover the port 90.

When the D-slide valve is thus moved to its leftmost position, air under pressure is supplied through the port 90 and passageway 98 to the lower end of the air cylinder 58 and at the same time air from the upper end of the air cylinder 58 is permitted to exhaust to the atmosphere through the passageway 100, port 94, port 92, and passageway 96. As a result of the differential pressures upon the opposite faces of the air piston, it will be moved upwardly until its movement is arrested by engagement of the upper end of the stem 44 with the lower extremity of the adjusting screw 74. During this upward movement of the air piston, the valve 48 will close the passageway through the lubricant pumping piston 38 and lubricant in the cylinder 34 above the piston 38 will therefore be discharged through the hose 16. At the same time, lubricant from adjacent the bottom of the drum 10 will be sucked into the lower end of the cylinder 24 past the foot valve 30. In this manner, the operator may, by temporarily pressing the plunger 144 upwardly, cause the initiation of a cycle of operation of the pump. Of course, this cycle of operation may be arrested if the discharge valve 18 is closed prior to the completion of the operating cycle.

The bore through the bushing 160 is of slightly larger diameter than the valve stem 150, and thus slight leakage of air may take place to replenish any air lost because of leakage past the piston 164.

It will be understood that in the operation of the apparatus, the mechanism will complete one cycle of operation and stop, provided the lubricant discharge valve 18 is held open during the complete cycle of operation. The apparatus may thus be used as a measuring pump, and for this purpose the adjustable stop 74 may be turned in or out to vary the length of stroke of the piston, and thus accurately adjust the apparatus for the discharge of a predetermined quantity of lubricant during each cycle of operation.

Under some circumstances it may be desired to have the pumping mechanism operate continuously as long as the lubricant discharge valve 18 is held open. Under these circumstances, the pump will be provided with a modified form of head 179 shown in Fig. 6. In this modified form of the invention, the street L 136 (Figure 2) is replaced by a plug 176, and the tube 130 communicates with a horizontal passageway 178. A check valve fitting 180 is threaded in the head 179. A ball valve 182 is held firmly against its seat by a strong compression coil spring 184 secured within the fitting 180. The spring is of sufficient strength with respect to the area of the valve 182, which is subjected to air pressure from the passageway 178, that the valve will be held against its seat against the normal air pressure of the compressed air supply. The valve 182 is adapted to be raised from its seat by a plunger 186 which is vertically slidable in a packed guide bushing 188. The lower end of the plunger 186 has a head 190 formed thereon for engagement with the end of the piston rod 44. From the above description of the construction of Fig. 6, it will be seen that as the motor piston approaches the upper end of its stroke, the piston rod 44 will engage the end of the plunger 186, 190, and through the latter raise the valve 182 from its seat, thus venting the passageway 178 to the atmosphere, and thereby causing the sequence of operations previously described. The operation of the pumping mechanism will thus be continuous as long as the lubricant discharge valve 182 is held open.

While I have shown and described particular embodiments of my invention, it will be apparent to those skilled in the art that numerous variations and alterations thereof may be made without departing from the underlying principles of the invention. I therefore desire, by the following claims, to include within the scope of my invention all such variations, modifications, and equivalent constructions whereby substantially the results of my invention may be obtained by substantially the same means.

I claim:

1. In a fluid pressure motor, the combination of a cylinder, a piston reciprocable therein, a valve for controlling the application of fluid pressure to the opposite ends of said cylinder, and means for controlling the operation of said valve; said last named means comprising a piston member connected to said valve, a cylinder for said piston member, conduit means to supply fluid under pressure to one side of said piston member thereby moving said valve in one direction, manually operable means for relieving the fluid pressure on said piston member, a spring operable to move said valve in the opposite direction, a second valve, operable by said piston, to open and close said conduit means, a second conduit means connecting said valve chamber and said last named cylinder; and means operable by the motion of said first named valve to close said second conduit means when said first named valve is moved in said opposite direction.

2. In a fluid pressure motor, the combination of a cylinder, a piston reciprocable therein, a valve for controlling the application of fluid pressure to the opposite ends of said cylinder alternately, a means for controlling the operation of said valve, said last named means comprising a piston member operatively connected to said valve, a spring operable to move said valve in one direction, conduit means for applying fluid pressure to said piston member to move said valve in the opposite direction, manually operable means for venting the fluid pressure applied to said valve, thereby to permit movement of said valve under the influence of said spring, and a valve in said conduit to control the flow of pressure fluid therethrough and operated by the motion of said piston.

3. In a fluid pressure motor, the combination of a cylinder, a piston reciprocable therein, a valve for controlling the application of fluid pressure to the opposite ends of said cylinder alternately, and means for controlling the operation of said valve, said last named means comprising a piston member connected to said valve, a spring for moving said valve in one direction, conduit means for applying fluid pressure to said piston member to move said valve in the opposite direction, a manually operable valve for relieving the fluid pressure upon said piston member, a second valve to control the flow of fluid through said conduit means, means for opening said second valve by the movement of said piston toward the end of its motion in one direction, resilient means biased to close said valve, and a manually adjustable stop controlling the distance said piston travels in the opposite direction.

4. In a fluid pressure motor, the combination of a cylinder, a piston reciprocable therein, a valve for controlling the application of fluid pressure to the opposite ends of said cylinder alternately, and means for controlling the operation of said valve, said last named means comprising a cylindrical chamber, a piston connected to said valve and reciprocable in said chamber, means operated by said first named piston as the latter approaches one end of its stroke to admit fluid under pressure to said chamber, means operated by said first named piston as it approaches the opposite end of its stroke for venting said chamber, a spring for moving said piston member upon venting of said chamber, a small passage connecting said cylindrical chamber with a source of fluid pressure, and means operated by said piston member to close said passage when said piston member is moved by said spring.

5. In a fluid pressure motor for lubricant pumping apparatus, the combination of a power cylinder, a power piston reciprocable in said cylinder, a source of pressure fluid, and a means for alternately connecting said source with the opposite ends of said power cylinder, said means comprising a housing having a valve chamber therein connected to said source; a two-position slide valve movable within said chamber, a push-pull rod to reciprocate said slide valve, an auxiliary cylinder near said valve chamber and connected thereto by a restricted opening; said push-pull rod extending into said auxiliary cylinder through said restricted opening and providing an annular passage around the push-pull rod and through said restricted opening, a valve control piston on said push-pull rod and positioned in said auxiliary cylinder, said valve control piston movable away from the restricted opening under the influence of pressure fluid flowing into the auxiliary cylinder from said source of pressure fluid, a valve operable for venting said auxiliary cylinder to the atmosphere to relieve the pressure therein, resilient means operable to move the push-pull rod in the opposite direction when the pressure in said auxiliary cylinder drops below a certain level, a valve member on said push-pull rod to close said restricted opening when the push-pull rod is moved in the said opposite direction, and a second valve operable to connect the auxiliary cylinder with the said source of pressure fluid.

6. In a fluid pressure motor for lubricant pumping apparatus, the combination of a power cylinder, a power piston reciprocable in said cylinder, a source of pressure fluid, and a means for alternately connecting said source with the opposite ends of said power cylinder, said means comprising a housing having a valve chamber therein connected to said source, a two-position slide valve movable within said chamber, a push-pull rod to reciprocate said slide valve, an auxiliary cylinder near said valve chamber and connected thereto by a restricted opening, said push-pull rod extending into said auxiliary cylinder through said restricted opening and providing an annular passage around the push-pull rod and through said restricted opening, a valve control piston on said push-pull rod and positioned in said auxiliary cylinder, said valve control piston movable away from the restricted opening under the influence of pressure fluid flowing into the auxiliary cylinder from said source of pressure fluid, a valve operable for venting said auxiliary cylinder to the atmosphere to relieve the pressure of said fluid therein, resilient means operable to move the push-pull rod in the opposite direction when said pressure is relieved, a valve member on said push-pull rod to close said restricted opening when the push-pull rod is moved in the said opposite direction, a second valve operable to connect the auxiliary cylinder with the said source of pressure fluid, and means operable by the power piston to open either said second valve or said valve operable for venting said auxiliary cylinder, the other of the last named two valves being manually operable.

7. In a fluid pressure motor for lubricant pumping apparatus, the combination of a power cylinder, a power piston reciprocable in said cylinder, a source of pressure fluid, and a means for alternately connecting said source with the opposite ends of said power cylinder, said means comprising a housing having a valve chamber therein connected to said source, a two-position slide valve movable within said chamber, a push-pull rod to reciprocate said slide valve, an auxiliary cylinder near said valve chamber and connected thereto by a restricted opening, said push-pull rod extending into said auxiliary cylinder through said restricted opening and providing an annular passage around the push-pull rod and through said restricted opening, a valve control piston on said push-pull rod and positioned in said auxiliary cylinder, said valve control piston movable away from the restricted opening under the influence of pressure fluid flowing into the auxiliary cylinder, a valve operable for venting said auxiliary cylinder to the atmosphere to permit pressure fluid to flow therefrom to relieve the fluid pressure therein, a spring operable to move the push-pull rod in the opposite direction when the pressure in said auxiliary cylinder is relieved, a valve member on said push-pull rod to close said restricted opening when the push-pull rod is moved in the said opposite direction, a second valve operable to connect the auxiliary cylinder with the said valve chamber, said valves being positioned at opposite ends of the power cylinder, and means operable by the power piston to open said valves alternately.

8. In a fluid pressure motor, the combination of a power cylinder, a power piston reciprocable in said cylinder, a source of pressure fluid, and a means for alternately connecting said source with the opposite ends of said power cylinder, said means comprising a housing having a valve chamber therein connected to said source, a two-position slide valve movable within said chamber, reciprocating means connected to said slide valve, an auxiliary cylinder near said valve chamber and connected thereto by a restricted opening, said reciprocating means extending into said auxiliary cylinder through said restricted opening and providing a passage around the reciprocating means and through said restricted opening, a valve control piston on said reciprocating means and positioned in said auxiliary cylinder, said valve control piston movable away from the restricted opening under the influence of pressure fluid flowing into the auxiliary cylinder, a valve operable for venting said auxiliary cylinder to the atmosphere to relieve the fluid pressure therein, a spring operable to move the reciprocating means in the opposite direction when said pressure is relieved, means to close said restricted opening when the reciprocating means is moved in the said opposite direction, and a second valve operable to connect the auxiliary cylinder with the said valve chamber.

9. In a fluid pressure motor, the combination of a power cylinder, a power piston reciprocable in said cylinder, a source of pressure fluid, and a means for alternately connecting said source with the opposite ends of said power cylinder, said means comprising a housing having a valve chamber therein connected to said source, a two-position slide valve movable within said chamber, an auxiliary cylinder near said valve chamber and connected thereto by a restricted opening, a valve control piston positioned in said auxiliary cylinder, a reciprocating means connecting said valve control piston to said slide valve, said valve control piston movable in one direction under the influence of pressure fluid flowing into the auxiliary cylinder, a valve operable for venting said auxiliary cylinder to the atmosphere to permit pressure fluid to flow therefrom thereby relieving the fluid pressure therein, a spring operable to move the reciprocating means in the opposite direction when said pressure is relieved, means to close said restricted opening when the reciprocating means is moved in the said opposite direction, and a second valve operable to connect the auxiliary cylinder with the said valve chamber.

10. In a fluid pressure motor, the combination of a power cylinder, a power piston reciprocable in said cylinder, a source of pressure fluid, and a means for alternately connecting said source with the opposite ends of said power cylinder, said means comprising a housing having a valve chamber therein connected to said source, a two-position slide valve movable within said chamber, an auxiliary cylinder near said valve chamber and connected thereto by a restricted opening, a valve control piston positioned in said auxiliary cylinder, a reciprocating means connecting said valve control piston to said slide valve, said valve control piston movable in one direction under the influence of pressure fluid flowing into the auxiliary cylinder, a valve operable for venting said auxiliary cylinder to the atmosphere to relieve the fluid pressure therein, a spring operable to move the reciprocating means in the opposite direction when said fluid pressure is relieved, means to close said restricted opening when the reciprocating means is moved in the said opposite direction, a second valve operable to connect the auxiliary cylinder with the said valve chamber, and means operable by the power piston to open at least one of said valves.

11. In a fluid pressure motor the combination of a power cylinder, a power piston reciprocable in said cylinder, a source of pressure fluid, and a means for alternately connecting said source with the opposite ends of said power cylinder, said means comprising a housing having a valve chamber therein connected to said source, a two-position slide valve movable within said chamber, an auxiliary cylinder near said valve chamber and connected thereto by a restricted opening, a valve control piston positioned in said auxiliary cylinder, a reciprocating means connecting said valve control piston to said slide valve, said valve control piston movable in one direction under the influence of pressure fluid flowing into the auxiliary cylinder, a valve operable for venting said auxiliary cylinder to the atmosphere to permit pressure fluid to flow therefrom thereby relieving the fluid pressure therein, a spring operable to move the reciprocating means in the opposite direction when said fluid pressure is relieved, means to close said restricted opening when the reciprocating means is moved in the said opposite direction, a second valve operable to connect the auxiliary cylinder with the said valve chamber, and means operable by the power piston to open one of said valves, the other of said valves adapted for manual operation.

ROBERT L. HARTER.